United States Patent
Jang

(10) Patent No.: US 9,340,123 B2
(45) Date of Patent: May 17, 2016

(54) POWER SUPPLY SYSTEM FOR ELECTRIC VEHICLE AND CONTROL METHOD THEREOF

(71) Applicant: LSIS CO., LTD., Anyang-si, Gyeonggi-do (KR)

(72) Inventor: Sung Jin Jang, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 828 days.

(21) Appl. No.: 13/662,216

(22) Filed: Oct. 26, 2012

(65) Prior Publication Data

US 2013/0106176 A1    May 2, 2013

(30) Foreign Application Priority Data

Oct. 27, 2011   (KR) .......................... 10-2011-0110755

(51) Int. Cl.
  *B60L 1/00*   (2006.01)
  *B60L 11/18*  (2006.01)

(52) U.S. Cl.
  CPC .......... *B60L 11/1868* (2013.01); *Y02T 10/7005* (2013.01); *Y02T 10/7066* (2013.01)

(58) Field of Classification Search
  CPC ......... B60L 1/00; B60L 11/1868; B60L 8/00; B60R 16/02; Y02T 10/7066; Y02T 10/7005; H02J 7/00
  USPC ............................... 307/9.1; 320/104; 180/65
  See application file for complete search history.

(56) References Cited

U.S. PATENT DOCUMENTS

| 4,129,819 | A  | * | 12/1978 | Arendt | .................... | H02J 7/244 322/28 |
| 2006/0232238 | A1 | * | 10/2006 | Horii | ........................ | B60K 6/28 320/104 |
| 2009/0015193 | A1 | * | 1/2009 | Esaka | ...................... | B60K 6/28 320/103 |
| 2012/0187919 | A1 | * | 7/2012 | Andersson | ............... | B60K 6/46 320/138 |
| 2012/0293124 | A1 | * | 11/2012 | Hirai | ..................... | H02J 7/1423 320/112 |

FOREIGN PATENT DOCUMENTS

| CN | 1855666 | 11/2006 |
| CN | 102214947 | 10/2011 |

(Continued)

OTHER PUBLICATIONS

Korean Intellectual Property Office Application Serial No. 10-2011-0110755, Office Action dated Oct. 22, 2012, 4 pages.

(Continued)

*Primary Examiner* — Rexford Barnie
*Assistant Examiner* — Terrence Willoughby
(74) *Attorney, Agent, or Firm* — Lee, Hong, Degerman, Kang & Waimey; Jonathan Kang; Richard Salfelder

(57) ABSTRACT

A power supply system for EV and a control method thereof are provided, the system including a high voltage battery generating a driving voltage to a motor of the EV, a low voltage battery generating a driving voltage for other electronic equipment, an LDC (low voltage DC-DC Converter) converting a high voltage generated by the high voltage battery to a low voltage, and generating a control power for charging the low voltage battery, an alternator generating a control power for charging the low voltage battery using a rotary power of the motor, and a control power selector selectively supplying the control power generated by the LDC or the alternator to the low voltage battery.

10 Claims, 3 Drawing Sheets

(56) References Cited

FOREIGN PATENT DOCUMENTS

| | | |
|---|---|---|
| JP | 2003-284208 | 10/2003 |
| JP | 2008-149897 | 7/2008 |
| JP | 4315232 | 8/2009 |
| JP | 2010-161904 | 7/2010 |
| JP | 2011-160530 | 8/2011 |
| KR | 10-2008-0054016 | 6/2008 |

OTHER PUBLICATIONS

Japan Patent Office Application Serial No. 2012-235850, Office Action dated Aug. 20, 2013, 3 pages.
The State Intellectual Property Office of the People's Republic of China Application Serial No. 201210418343.0, Office Action dated May 20, 2014, 9 pages.

* cited by examiner

POWER SUPPLY SYSTEM FOR ELECTRIC VEHICLE AND CONTROL METHOD THEREOF

CROSS-REFERENCE TO RELATED APPLICATIONS

Pursuant to 35 U.S.C. §119 (a), this application claims the benefit of earlier filing date and right of priority to Korean Patent Application No. 10-2011-0110755, filed on Oct. 27, 2011, the contents of which are hereby incorporated by reference in their entirety.

BACKGROUND OF THE DISCLOSURE

1. Field of the Disclosure

The present disclosure relates to a power supply system for electric vehicle and control method thereof, and more particularly to a power supply system for electric vehicle configured to select a control power for charging a low voltage battery and a control method thereof.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

In recent years, with the aim of reducing $CO_2$ discharge in an attempt to prevent global warming and air pollution, hybrid electric vehicles (HEVs) that are provided with a secondary battery and that use both an engine and a motor as a power source, have become increasingly popular, and electric vehicles (EVs) that are provided with a secondary battery and that emit no exhaust gas are also starting to receive attention, where an electric motor is driven by electricity to operate the EV, and the battery supplies electricity to the electric motor. Generally, EVs refer to those which utilize electricity for power to a large extent, and typical EVs include an HEV (Hybrid Electric Vehicle), a PHEV (Plug-in Hybrid Electric Vehicle), and an EV (Electric Vehicle).

Generally, a power system of an EV includes a main battery (high voltage battery) supplying a driving power to a driving motor, a BMS (Battery Management System), a sub-battery (low voltage battery) providing a driving power to other vehicular electronic equipment and a host of electric devices.

An inverter may act as an intermediary between battery and electric motor. That is, an inverter converts a high DC (direct current) voltage generated by the main battery (high voltage battery) to an AC (alternating current) signal to control a motor. A low voltage DC-DC Converter (LDC) converts electric power of a high voltage battery into a direct current. That is, the LDC switches a direct current to an alternating current, boosts or drops the alternating current using coil, transformer, capacitance, etc., rectifies the resulting alternating current to a direct current and supplies electricity suitable for voltages used in respective electrical loads. In further details, the LDC converts the high voltage generated by the main battery (high voltage battery) to a low voltage, and outputs the low voltage to charge the sub-battery (low voltage battery).

An alternator mounted on a conventional engine vehicle serves to generate a predetermined voltage using an engine power and supply the voltage to each electric load on the vehicle and simultaneously supply a charged voltage to a battery.

Meanwhile, driving powers for motor and other electronic equipment of an EV are provided by the main battery, which is a main power of the EVs. It takes long hours to charge the main battery and a running distance of an EV by one time of charging is limited, such that many efforts are being waged to reduce the power consumption of the EV.

In an electric vehicle, the charging voltage for sub-battery is supplied from the main battery through the LDC. That is, the LDC continuously supplies a high voltage to the main battery, which is then converted to a low voltage to the sub-battery as a charging voltage. As a result, there is created a problem of continuously consuming the power of the main battery for charging the sub-battery. In addition, since the life span of the sub-battery is relatively short, it becomes necessary to replace a plurality of batteries while using the EV. Naturally, this results in additional costs over time.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a power supply system for electric vehicle configured to charge a low voltage battery using a rotational power of a motor or a high voltage battery in the electric vehicle, and a control method using the power supply system.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a power supply system for electric vehicle (EV), the system including a high voltage battery generating a driving voltage to a motor of the EV, and a low voltage battery generating a driving voltage for other electronic equipment, the system comprising: an LDC (low voltage DC-DC Converter) converting a high voltage generated by the high voltage battery to a low voltage, and generating a control power for charging the low voltage battery; an alternator generating a control power for charging the low voltage battery using a rotary power of the motor; and a control power selector selectively supplying the control power generated by the LDC or the alternator to the low voltage battery.

In some exemplary embodiments, the alternator generates a DC voltage by rectifying an AC voltage generated by the rotary power of the motor.

In some exemplary embodiments, the control power selector provides the voltage generated by the alternator to the low voltage battery as the control power, in a case the generated voltage by the alternator is greater than a predetermined reference voltage.

In some exemplary embodiments, the control power selector provides the low voltage converted by the alternator to the low voltage battery as the control power, in a case the generated voltage by the alternator is smaller than a predetermined reference voltage.

In some exemplary embodiments, the control power selector includes a switch in which a first terminal is fixedly connected to the low voltage battery, and a second terminal is selectively connected to the LDC or the alternator.

In some exemplary embodiments, the switch is configured such that the second terminal is connected to the alternator, in a case the generated voltage of the alternator is greater than a predetermined reference voltage, and the second terminal is connected to the LDC, in a case the generated voltage of the alternator is smaller than a predetermined reference voltage.

In some exemplary embodiments, the switch is configured such that the second terminal is connected to the alternator, in a case the EV is running, and the second terminal is connected to the LDC, in a case the EV is stopped in running or at an initial operation.

In some exemplary embodiments, the high voltage battery is configured such that a plurality of battery cells is connected in a serial method, or in a parallel method of serially connected battery cells.

In another general aspect of the present disclosure, there is provided a control method of a power supply system for electric vehicle (EV), the system including a high voltage battery generating a driving voltage to a motor of the EV, and a low voltage battery generating a driving voltage for other electronic equipment, the method comprising: generating, by an alternator, a DC voltage using a rotary power of the motor; comparing the DC voltage generated by the alternator with a predetermined reference voltage; and providing the DC voltage generated by the alternator or an output voltage of an LDC to the low voltage battery as a control power as a result of the comparison.

In some exemplary embodiments, the LDC generates a control power for charging the low voltage battery by converting a high voltage generated by the high voltage battery to a low voltage.

In some exemplary embodiments, the step of providing to the low voltage battery as a control power includes providing the DC voltage generated by the alternator to the low voltage battery as the control power, in a case the generated DC voltage of the alternator is greater than a predetermined reference voltage.

In some exemplary embodiments, the step of providing the low voltage battery as a control power includes providing the low voltage converted by the LDC to the low voltage battery as a control power, in a case the generated DC voltage of the alternator is smaller than a predetermined reference voltage.

The power supply system for electric vehicle and control method thereof have an advantageous effect in that a power consumption by a high voltage battery can be greatly reduced by allowing an alternator to cover or appropriate a DC voltage generated by a rotational power of a motor by a control power, without consuming a power from a high voltage battery while the electric vehicle is running, by mounting the alternator capable of generating a DC voltage and allowing an LDC or the alternator to selectively supply a control power for charging a low voltage battery.

Other exemplary aspects, advantages, and salient features of the disclosure will become more apparent to persons of ordinary skill in the art from the following detailed description, which, taken in conjunction with the annexed drawings, discloses exemplary embodiments of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

Figure 1:
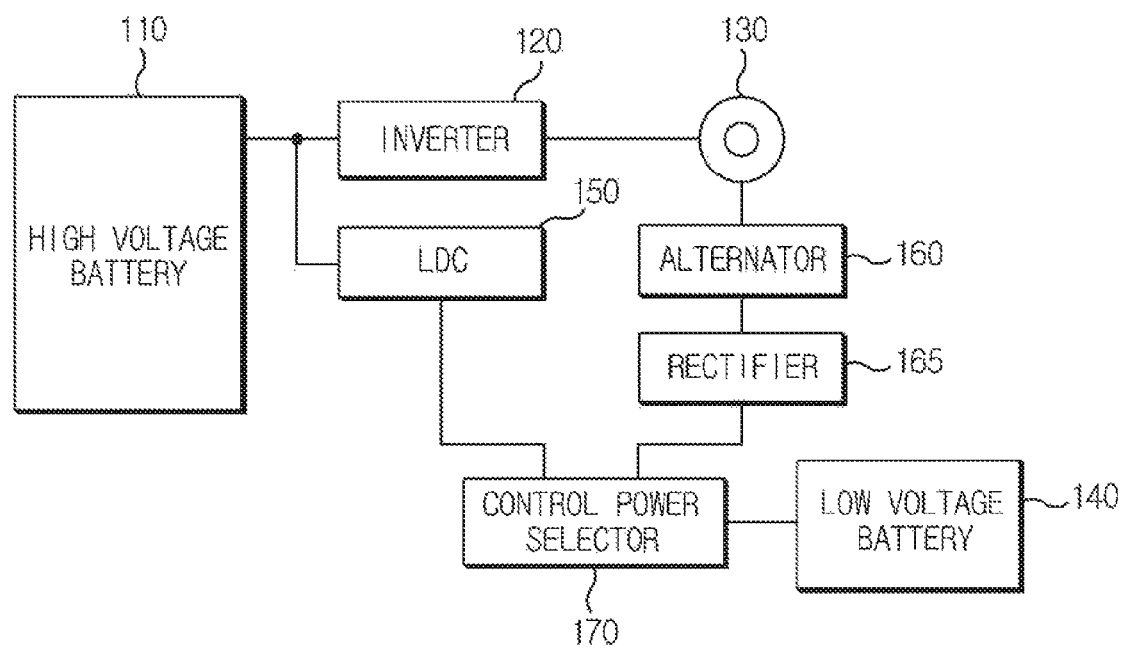
FIG. 1 is a block diagram illustrating the configuration of a power supply system for an electric vehicle according to an exemplary embodiment of the present disclosure.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

FIG. 1 is a block diagram illustrating the configuration of a power supply system for an electric vehicle according to an exemplary embodiment of the present disclosure.

Referring to FIG. 1, the power supply system for electric vehicle (EV) according to an exemplary embodiment of the present disclosure includes a high voltage battery (110) supplying a high voltage driving power, an inverter (120), a motor (130), a low voltage battery (140) providing a driving power to low voltage electronic equipment of the EV, an LDC (low voltage DC-DC Converter, 150) charging the low voltage battery, an alternator (160) and a control power selector (170).

Constituent parts illustrated in FIG. 1 are the ones for illustrating the present disclosure, and it should be apparent to the skilled in the art that the power supply system for the EV according to an exemplary embodiment of the present disclosure can be formed with more constituent parts than are illustrated in FIG. 1.

The high voltage battery (110), as a driving power source, provides a high voltage for driving high voltage electrical loads such as the motor (130) of the EV. The high voltage battery (110) may include a plurality of battery cells connected in series, or in a parallel method of serially connected battery cells for supplying a high voltage (e.g., 300V) to the motor (130). Generally, each of the plurality of battery cells outputs several volts to dozens of volts.

The inverter (120) receives several hundreds of high voltages (e.g., 300V) from the high voltage battery (110). The inverter (120) converts a high voltage DC to a high voltage AC to drive and control the motor (130) of the EV.

The motor (130) receives turning effect (torque) from the power supplied from the high voltage battery (110) via the inverter (120) to drive the EV. The low voltage battery (140) provides a driving power to various electrical loads of the EV. In view of the fact that the electrical loads are generally operated by a low voltage, e.g., 12V or 24V, the low voltage battery (140) is provided as a sub-battery that is separately mounted from the high voltage battery (110) which is a main battery supplying a driving power to the EV.

The LDC (150) uses the high voltage generated by the high voltage battery (110) to charge the low voltage battery (140). That is, the LDC receives the high voltage from the high voltage battery (110), converts the high voltage to a low voltage of several dozens of voltages, and provides the converted low voltage as a control power for charging the low voltage battery (140).

The control power defines a charging power for charging the low voltage battery (140). For example, in order for the low voltage battery (140) to supply 12V, a voltage level of the control power is preferably higher by several volts than the 12V. The LDC (150) continuously receives the high voltage from the high voltage battery (110) in order to supply a charging control power to the low voltage battery (140), whereby the high voltage battery (110) is continuously consumed.

The alternator (160) converts mechanical energy to electrical energy in response to rotation of the motor (130) to charge the low voltage battery (140). That is, the alternator (160) generates AC from rotational energy of the motor (130), where the AC is rectified by a rectifier (165) to generate a DC generating voltage.

The alternator (160) and the rectifier (165) provide the DC generating voltage as a control power for charging the low voltage battery (140). The alternator (160) and the rectifier (165) can supply the control power for charging the low voltage battery (140) without consuming power of the other power sources (e.g., high voltage battery) while the EV is running because the alternator (160) generates the DC voltage using the rotational energy of the motor (130) in response to the running of the EV.

The control power selector (170) selectively provides the control power generated by the LDC (150) or the rectifier (165) to the low voltage battery (140). The control power selector (170) determines whether to supply the control power generated by the LDC (150) to the low voltage battery (140) or to supply the control power generated by the rectifier (165) to the low voltage battery (140) in response to the size of the DC voltage generated by the rectifier (165).

If the size of the DC voltage generated by the rectifier (165) is greater than a predetermined reference voltage, the control power selector (170) can supply the DC voltage generated by the rectifier (165) to the low voltage battery (140) as the control power.

The case where the size of the DC voltage generated by the rectifier (165) is greater than the predetermined reference voltage is a case when the EV is running, and also a case when a sufficient DC voltage can be generated by the rotational energy of the motor (130).

If the size of the DC voltage generated by the rectifier (165) is smaller than the predetermined reference voltage, the control power selector (170) may supply the low voltage converted by the LDC (150) to the low voltage battery (140) as the control power, since the rectifier (165) cannot generate a sufficient DC voltage from the rotational energy of the motor (130).

At this time, the control power selector (170) for selectively supplying the control power for charging the low voltage battery may include a switch, which means that a switch manipulation is needed for control power selection, where the switch is controlled by a switching signal generated from inside of the EV to automatically implement the control power selection, or the control power may be selected by manual manipulation of the switch by a user.

When the control power selection is automatically implemented, a comparison between the DC voltage of the rectifier (165) and the predetermined reference voltage must be implemented in advance, which may be performed by the control power selector (170). Alternatively, the comparison between the DC voltage of the rectifier (165) and the predetermined reference voltage may be performed by a main control unit mounted on the EV, which is not shown in FIG. 1.

The control power selector (170) or the main control unit may generate a switching signal as a result of the comparison, which is then provided.

Hereinafter, operation of the switch mounted on the control power selector (170) will be described with reference to FIG. 2.

Figure 2:
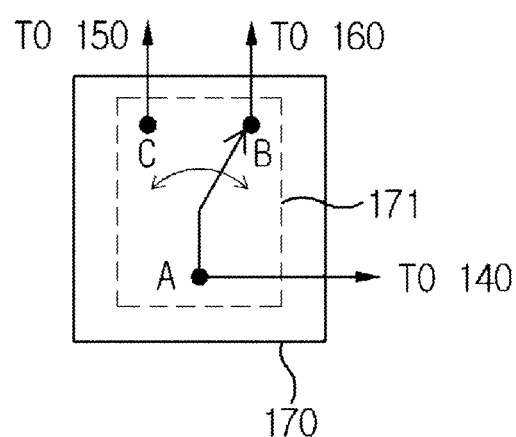
FIG. 2 is a schematic view illustrating a control power selector included in a power supply system for an electric vehicle according to an exemplary embodiment of the present disclosure.

FIG. 2 is a schematic view illustrating a control power selector included in a power supply system for an electric vehicle according to an exemplary embodiment of the present disclosure, where the control power selector (170) mounted with a switch (171) is illustrated.

Referring to FIG. 2, a first terminal of the switch (171) is fixedly connected to the low voltage battery (140). The selection of the control power is implemented by a connected state of a second terminal, where the second terminal is selectively connected to the LDC (150) or the rectifier (165) (i.e., B or C).

The second terminal of the switch (171) is selectively connected to the LDC (150) or the rectifier (165) in response to a switching signal as a result of the comparison by the control power selector (170) or the main control unit of the DC voltage generated by the alternator (160) and the predetermined reference voltage.

If the size of the DC voltage generated by the alternator (160) and the rectifier (165) is greater than the predetermined reference voltage, the switching signal controls the second terminal of the switch (171) to be connected to the rectifier (165). As a result, the DC voltage generated by the alternator (160) and rectifier (165) is provided as a control power for charging the low voltage battery (140).

If the size of the DC voltage generated by the alternator (160) and the rectifier (165) is smaller than the predetermined reference voltage, the switching signal controls the second terminal of the switch (171) to be connected to the LDC (150). As a result, the low voltage converted by the LDC (150) is provided as a control power for charging the low voltage battery (140).

As noted previously, the power supply system for EV according to an exemplary embodiment of the present invention has an advantageous effect in that a control power is selectively supplied from the LDC (150) or from the rectifier (165) for charging the low voltage battery (140) to greatly reduce power consumption of the high voltage battery (110) by covering or appropriating the control power using the rotational power of the motor (130) without consuming the power of the high voltage battery (110) while the EV is running.

Figure 3:
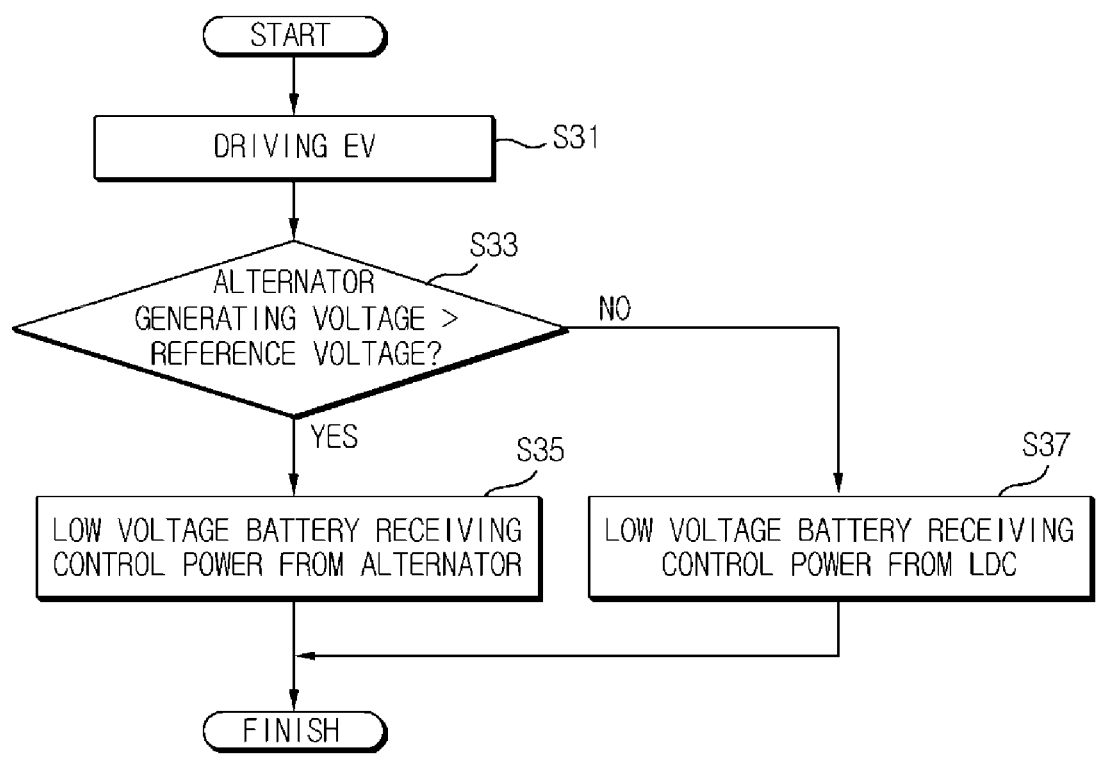
FIG. 3 is a flowchart illustrating a control method of a power supply system for an electric vehicle according to another exemplary embodiment of the present disclosure Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

FIG. 3 is a flowchart illustrating a control method of a power supply system for an electric vehicle according to another exemplary embodiment of the present disclosure.

Referring to FIG. 3, if an initial operation of the EV is started (S31), a comparison is made between the DC voltage from the rectifier (165) and a predetermined reference voltage in order to select a control power for charging the low voltage battery (140) (S33). When the rotational power of a motor is not sufficient within a predetermined time from the initial start of the EV, and the DC voltage level generated by the alternator (160) is low, a sufficient DC voltage can be generated from the rotational power of the motor while the EV is running (i.e., while the EV is moving continuously).

As a result of the comparison, if the DC voltage generated by the alternator (160) and the rectifier (165) is greater than the predetermined reference voltage, the control power selector (170) supplies the DC voltage of the rectifier (165) as the control voltage to the low voltage battery (140) (S35), which corresponds to a case where the EV is running (i.e., while the EV is moving continuously), such that a sufficient DC voltage for charging the low voltage battery (140) can be generated from the rotational power of the motor (130).

As a result of the comparison, if the DC voltage generated by the alternator (160) and the rectifier (165) is smaller than the predetermined reference voltage, the control power selector (170) supplies the low voltage of the LDC (150) as the control voltage to the low voltage battery (140) (S37), which corresponds to a case right after the EV is started or within a predetermined time subsequent thereto where when the DC voltage generated by the alternator (160) and rectifier (165) is low due to the rotational power of the motor (130) being insufficient and there is a need of receiving a control power for charging the low voltage battery (140) from the high voltage battery (110).

The LDC (150) can convert and output a high voltage outputted from the high voltage battery (110) to a low voltage regardless of the rotational power of the motor (130) and the running state of the EV, such that the control power selector (170) supplies the low voltage outputted from the LDC (150) to the low voltage battery (140) as the control power of the low voltage battery (140).

The high voltage system of the present invention can be suitably used for all types of electric vehicles that start running by means of electric energy of a high voltage battery, such as an EV (Electric Vehicle), an HEV (Hybrid Electric Vehicle), and a PHEV (Plug-in Hybrid Electric Vehicle).

The above-mentioned power supply system and control method thereof according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A power supply system for electric vehicle (EV), the system including a high voltage battery generating a driving voltage to a motor of the EV, and a low voltage battery generating a driving voltage for other electronic equipment, the system comprising:
   a low voltage DC-DC converter (LDC) configured to convert a high voltage from the high voltage battery to a first voltage for the low voltage battery;
   an alternator configured to generate an AC voltage using a rotary power of the motor;
   a rectifier configured to rectify the AC voltage from the alternator to generate a second voltage, the second voltage including a DC voltage;
   a comparator to compare the second voltage with a reference voltage; and
   a selector configured to supply the second voltage from the rectifier to the low voltage battery when the second voltage is greater than the reference voltage and supply the first voltage from the LDC to the low voltage battery when the second voltage is less than the reference voltage.

2. The system of claim 1, wherein the selector includes a switch in which a first terminal is connected to the low voltage battery, and a second terminal is selectively connected to the LDC or the rectifier.

3. The system of claim 2, wherein the switch is configured such that the second terminal is connected to the rectifier when the second voltage is greater than the reference voltage, or the second terminal is connected to the LDC when the second voltage is less than the reference voltage.

4. The system of claim 2, wherein the switch is configured such that the second terminal is connected to the rectifier when the EV is running, or the second terminal is connected to the LDC when the EV stops or is at an initial operation.

5. The system of claim 1, wherein the second voltage is greater than the reference voltage when the EV is running.

6. The system of claim 1, wherein the second voltage is less than the reference voltage when the EV stops or is at initial operation.

7. A method for controlling a power supply system for electric vehicle (EV), the system including a high voltage battery generating a driving voltage to a motor of the EV, and a low voltage battery generating a driving voltage for other electronic equipment, the method comprising:
   converting, by a low voltage DC-DC converter (LDC), a high voltage from the high voltage battery to a first voltage for the low voltage battery;
   generating, by an alternator, an AC voltage using a rotary power of the motor;
   rectifying, by a rectifier, the AC voltage to a second voltage, the second voltage including a DC voltage;
   comparing, by a comparator, the second voltage with a reference voltage; and
   supplying, by a selector, the second voltage from the rectifier to the low voltage battery when the second voltage is greater than the reference voltage and supplying the first voltage from the LDC to the low voltage battery when the second voltage is less than the reference voltage.

8. The method of claim 7, wherein the LDC converts a high voltage from the high voltage battery to the first voltage for the low voltage battery.

9. The method of claim 7, wherein the second voltage is greater than the reference voltage when the EV is running.

10. The method of claim 7, wherein the second voltage is less than the reference voltage when the EV stops or is at initial operation.

* * * * *